United States Patent
Stender

(10) Patent No.: US 11,815,126 B2
(45) Date of Patent: Nov. 14, 2023

(54) TWIST-BASE MOUNT

(71) Applicant: Timothy P. Stender, Otsego, MI (US)

(72) Inventor: Timothy P. Stender, Otsego, MI (US)

(*) Notice: Subject to any disclaimer, the term of this patent is extended or adjusted under 35 U.S.C. 154(b) by 0 days.

(21) Appl. No.: 17/854,326

(22) Filed: Jun. 30, 2022

(65) Prior Publication Data
US 2022/0333628 A1   Oct. 20, 2022

Related U.S. Application Data

(63) Continuation of application No. 17/530,947, filed on Nov. 19, 2021, now abandoned, which is a continuation of application No. 17/228,984, filed on Apr. 13, 2021, now abandoned, which is a continuation of application No. 17/010,282, filed on Sep. 2, 2020, now abandoned, which is a continuation of application No. 15/086,019, filed on Mar. 30, 2016, now abandoned.

(51) Int. Cl.
| | |
|---|---|
| *F16B 5/06* | (2006.01) |
| *F16L 3/01* | (2006.01) |
| *F16L 3/13* | (2006.01) |

(52) U.S. Cl.
CPC .............. *F16B 5/0685* (2013.01); *F16L 3/01* (2013.01); *F16L 3/13* (2013.01)

(58) Field of Classification Search
CPC .............. F16B 5/0685; F16L 3/01; F16L 3/13
USPC ...... 248/71, 55, 74.22, 316.7, 231.81, 230.7, 248/216.1, 546, 684, 65, 49; 411/396, 411/401, 400
See application file for complete search history.

(56) References Cited

U.S. PATENT DOCUMENTS

| | | | | |
|---|---|---|---|---|
| 500,616 | A * | 7/1893 | Rosenquest | F16L 3/04 248/71 |
| 1,449,779 | A * | 3/1923 | Race | F16B 37/14 411/375 |
| 1,548,128 | A * | 8/1925 | Fisher | D06F 57/00 248/74.1 |
| 1,697,878 | A * | 1/1929 | Mills | G09F 5/042 248/216.1 |
| 1,719,136 | A * | 7/1929 | Rosenberg | F16B 39/24 248/217.4 |
| 1,906,874 | A * | 5/1933 | Platt | A47L 13/512 24/457 |
| 2,007,179 | A * | 7/1935 | Bullis | A47J 36/40 411/967 |

(Continued)

*Primary Examiner* — Kimberly T Wood
(74) *Attorney, Agent, or Firm* — Gunther Evanina; BUTZEL LONG

(57) ABSTRACT

The Twist-Base Mount couples a single-screw, substrate-penetrating element with an elastically-deformable, concave base element that, once installed, acts as a spring, exerting a downward force upon the substrate around its circumference. Because the base element is rigidly attached to the substrate-penetrating element, a force applied to the Mount parallel to the plane of the substrate is offset by the pressure of the perimeter of the base element against the substrate, resulting in additional strength. The Mount's single-screw, self-boring element allows quick and easy installation. The spring-like base-element permits 360-degree rotation of the Mount while maintaining uniform pressure against the substrate, thereby preserving strength regardless of rotational positioning. The mount remains economical in relation to mounts of similar strength and rotational adjustability due to its insert-molded construction.

18 Claims, 2 Drawing Sheets

(56) References Cited

U.S. PATENT DOCUMENTS

| | | | | |
|---|---|---|---|---|
| 2,155,189 | A | * | 4/1939 | Heinrich ............... H01B 17/20 174/165 |
| 2,334,406 | A | * | 11/1943 | Gray ..................... E04D 5/145 411/484 |
| 2,382,945 | A | * | 8/1945 | Trafton .................. F16L 3/233 24/20 EE |
| 2,527,053 | A | * | 10/1950 | Bedford, Jr. .......... B62D 25/24 411/372.5 |
| 2,528,288 | A | * | 10/1950 | Rublee .................... F16L 3/04 411/480 |
| 2,670,914 | A | * | 3/1954 | Jones ..................... F16F 1/422 267/141.6 |
| 2,769,606 | A | * | 11/1956 | Larson ................... H01Q 1/16 411/149 |
| 2,795,834 | A | * | 6/1957 | Szoke .................... A47G 29/08 248/113 |
| 2,833,326 | A | * | 5/1958 | Knohl ................. F16B 35/044 411/959 |
| 2,885,460 | A | * | 5/1959 | Borresen ................. H02G 3/32 248/74.2 |
| 3,036,487 | A | * | 5/1962 | Hughes ................ F16B 35/041 411/352 |
| 3,194,524 | A | * | 7/1965 | Trumbull .................. F16L 3/13 248/229.15 |
| 4,074,501 | A | * | 2/1978 | Sandqvist ............ E04D 3/3603 156/92 |
| 4,231,279 | A | * | 11/1980 | Theriot ................... F16B 43/00 411/396 |
| 4,987,714 | A | * | 1/1991 | Lemke ................ F16B 19/1081 52/410 |
| 5,407,313 | A | * | 4/1995 | Bruins .................... E04D 5/145 411/542 |
| 5,716,161 | A | * | 2/1998 | Moore ................... F16B 35/06 24/453 |
| 6,282,857 | B1 | * | 9/2001 | Rubenacker ........... E04D 5/145 411/537 |
| 6,957,931 | B2 | * | 10/2005 | Slater ................ E21D 21/0086 405/302.1 |

* cited by examiner

TWIST-BASE MOUNT

CROSS-REFERENCE TO RELATED APPLICATIONS

This application is a continuation of U.S. patent application Ser. No. 17/530,947, filed Nov. 19, 2021, which is a continuation of U.S. patent application Ser. No. 17/228,984, filed Apr. 13, 2021, which is a continuation of U.S. patent application Ser. No. 17/010,282, filed Sep. 2, 2020, and claims priority under 35 U.S.C. § 120 to U.S. patent application Ser. No. 15/086,019, filed Mar. 30, 2016. The entire contents of the aforementioned applications are incorporated herein by reference.

BACKGROUND OF THE DISCLOSURE

This invention pertains to the field of mounts and mounting systems, and more particularly to a single-screw, rotatable mounting system for affixing a fixture to a substrate.

The related art includes mounting systems that comprise a planar base element designed to rest against a substrate and a substrate-penetrating element that extends orthogonally downward from the base element for affixing the mount to the substrate.

Mounting systems vary in strength (the amount of weight that can be supported when affixed to given substrate), speed of installation (the amount of time required to affix the mount to a substrate), rotational adjustability (the degree to which the mount can pivot after installation while maintaining strength), and economy (the degree to which the mount is not costly). While all four attributes are desirable, they are, in general, mutually exclusive or offsetting. For example, a strong mount would be expected to cost more, due to its complexity or materials, or require more time to install, perhaps due to multiple substrate-penetrating elements.

BRIEF SUMMARY OF THE DISCLOSURE

The Twist-Base Mount solves the preceding dilemma by its unique structure, which couples a single-screw, substrate-penetrating element with a flexible, concave base element that, once installed, acts as a spring, exerting a downward force upon the substrate around its circumference. Because the base element is rigidly attached to the substrate-penetrating element, a force applied to the mount parallel to the plane of the substrate is offset by the pressure of the perimeter of the base element against the substrate, resulting in additional strength. Yet the mount's single-screw, self-boring, substrate-penetrating element still allows quick and easy installation, and the spring-like, concave base-element permits 360-degree rotation of the mount while maintaining uniform pressure against the substrate, thereby preserving strength regardless of rotational positioning. Nonetheless, the mount remains economical in relation to mounts of similar strength and rotational adjustability due to its insert-molded construction, in which the elastic base element is formed and rigidly affixed to a rigid substrate-penetrating element (such as a steel screw) by a single-step, plastic-injection molding process.

DETAILED DESCRIPTION

Figure 1:
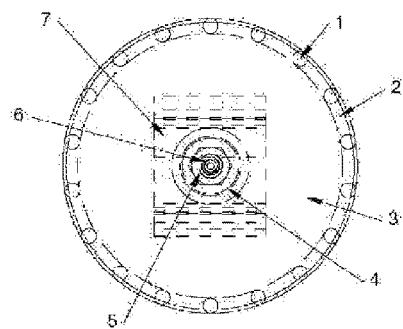
FIG. 1 is a sectioned top view of the Twist-Base Mount showing the self-boring single screw molded into the bottom of the base element and a conduit holder attached to the top of the base element.
Figure 3:
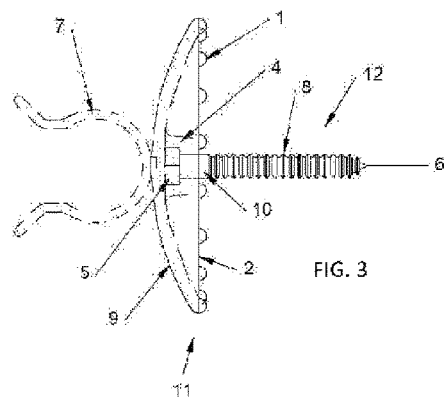
FIG. 3 is a sectioned side view of the Twist-Base Mount showing the self-boring single screw protruding from the bottom of the base element and a conduit holder attached to the top of the base element, with the holder oriented parallel to the point of view.
Figure 2:
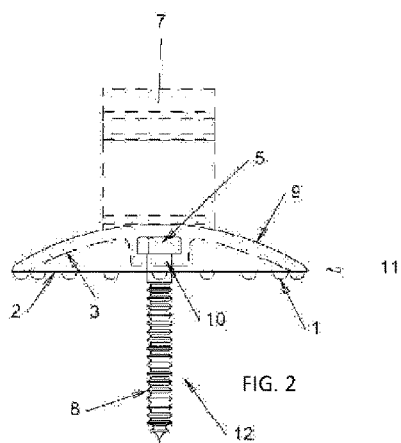
FIG. 2 is a sectioned side view of the Twist-Base Mount showing the self-boring single screw protruding from the bottom of the base element and a conduit holder attached to the top of the base element, with the holder oriented perpendicular to the point of view.
Figure 5:
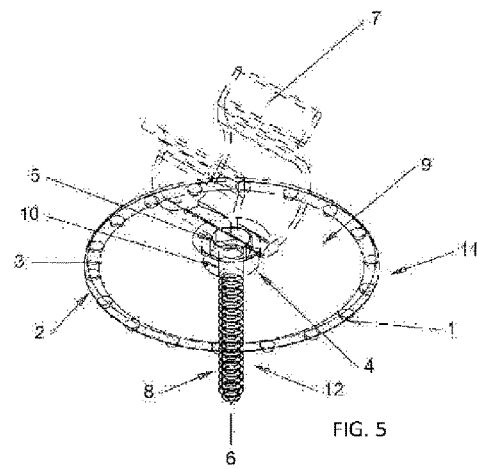
FIG. 5 is a perspective view of the Twist-Base Mount showing the top of the base element, a partially-sectional view of the self-boring single screw protruding from the bottom of the base element, and a conduit holder attached to the top of the base element, with the holder oriented at a 45-degree angle to the point of view.
Figure 4:
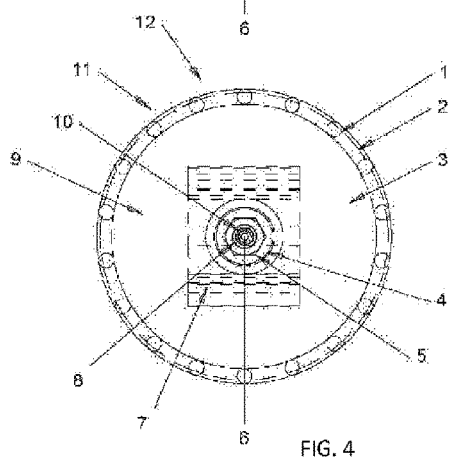
FIG. 4 is a sectioned bottom view of the Twist-Base Mount showing the self-boring single screw molded into the bottom of the base element and a conduit holder attached to the top of the base element.
Figure 6:
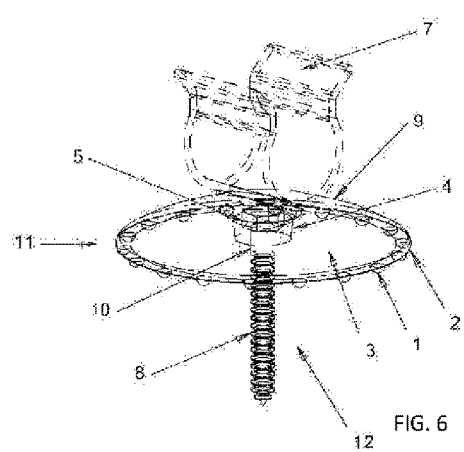
FIG. 6 is a perspective view of the Twist-Base Mount showing the bottom of the base element, the self-boring single screw protruding from the bottom of the base element, and a partially-sectional view of a conduit holder attached to the top of the base element, with the holder oriented at a 45-degree angle to the point of view.

Referring to FIGS. 1-6, a stable, rotatably-adjustable, self-boring mount for fixtures (the "Twist-Base Mount" or "Mount"), comprises a hollow, deformable, dome-shaped base element 11 made of a thermoplastic material. The dome shape can be a section of a sphere or an ellipsoid cut by a plane in which the ratio of the width of the base to the height of the base can be between 4 and 8. The diameter of the base can be from 1.5 inches to 2.5 inches. A self-boring, screw element 12 is attached to the underside of the base element. Base element 11 comprises a convex, fixture-supporting topside portion 9, a concave, substrate-facing, underside portion 3 opposite the topside portion, a generally cylindrical or frustoconical hub 4 extending perpendicularly away from the center of said underside portion 3, and a substrate-engaging portion defined by a circumferential edge 2. A plurality of protuberances 1 (each, a "detent" or "nub") are defined on the circumferential edge 2. Each detent can have a hemispherical shape and a base diameter less than or equal to the width of the edge 2. Protuberances 1 can be uniformly spaced-apart along the circumferential edge 2. The detents provide additional friction between the edge 2 and the substrate to prevent unintentional rotation of the base 11. Hub 4 has a flat lower surface. When the Mount is installed, the lower surface of hub 4 abuts the substrate, preventing further penetration of the substrate by screw element 12, which in turn prevents an excessive deformation of base 11. Screw element 12 comprises a non-circular head portion 5 (for instance, a hex head, as depicted, or a thumb-screw head) that resists twisting when embedded in the base element, a shaft with a threaded portion 8, an optional non-threaded portion 10, and a pointed substrate-engaging tip with sharp threads to facilitate self-boring penetration of the substrate and fixation to the substrate with sufficient grip to compress the circumferential edge 2 against the substrate and effectuate a counteracting elastic deformation of the dome-shaped base element 11. Non-circular head portion 5 is rigidly embedded in hub portion 4. Threaded portion 8 can have a thread density between 10 and 16 threads per inch. Threaded portion 8 and non-threaded portion 10 (collectively, the "shank" of the screw element) are, optionally, tapered. The screw element has a tip 6 that is, optionally, self-tapping and/or self-drilling. The length of the screw can be from 0.5 to 1.5 inches. A fixture such as a conduit holder 7 is attached to the topside of the base element.

Because the base element 11 is rigidly attached to the screw element 12, a force applied to the fixture 7 in the plane perpendicular to the axis of the screw element 12 is counteracted by a force exerted on the substrate by the circumferential edge 2 of the elastically-deformable, spring-like base element 11. Unlike the prior art, this spring-like quality imparts additional strength to the Twist-Base Mount, while the Mount's single-screw, self-boring, substrate-penetrating element still permits quick and easy installation, and the spring-like quality of base element 11 permits 360-degree rotation of the mount while maintaining uniform pressure against the substrate, thereby preserving strength regardless of the rotational positioning of the Mount.

Figure 7:
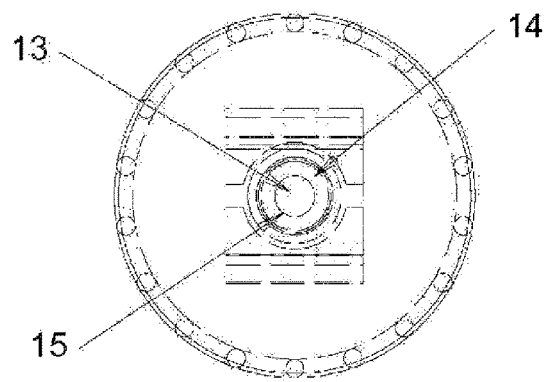
FIG. 7 is a sectioned top view of a variation of the Twist-Base Mount in which the self-boring, single screw is not insert-molded into the base element, but rather a counter-sunk hole is provided into which a separate, self-boring single screw can be inserted. A conduit holder attached to the top of the base element.
Figure 8:
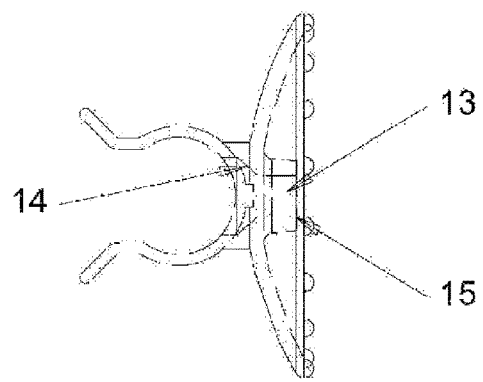
FIG. 8 is a sectioned side view of a variation of the Twist-Base Mount in which the self-boring, single screw is not insert-molded into the base element, but rather a counter-sunk hole is provided into which a separate, self-boring, single screw can be inserted. A conduit holder attached to the top of the base element, with the holder oriented perpendicular to the point of view.
Figure 9:
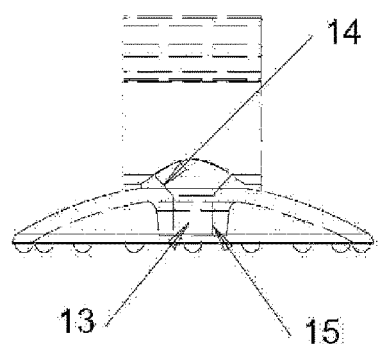
FIG. 9 is a sectioned side view of a variation of the Twist-Base Mount in which the self-boring, single screw is not insert-molded into the base element, but rather a counter-sunk hole is provided into which a separate, self-boring, single screw can be inserted. A conduit holder attached to the top of the base element, with the holder oriented parallel to the point of view.
Figure 10:
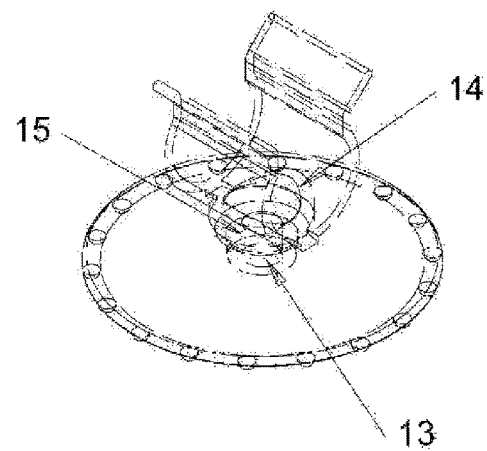
FIG. 10 is a perspective view of a variation of the Twist-Base Mount showing the top of the base element in which the self-boring, single screw is not insert-molded into the base element, but rather a counter-sunk hole is provided into which a separate, self-boring, single screw can be inserted. A conduit holder attached to the top of the base element.

FIGS. 7-10 depict a variation of the Twist-Base Mount (the "Countersunk Mount") that is identical to the Twist-Base Mount except that a self-boring, single screw is not insert-molded into the base element, but rather a countersunk hole is provided into which a separate, self-boring, single screw can be inserted and seated. The features of the Countersunk Mount depicted in FIGS. 7, 8, 9, and 10 are identical to those of Twist-Base Mount depicted in FIGS. 1, 2, 3, and 4 except that the screw element 12 appearing in FIGS. 1, 2, 3, and 4 is absent and instead, in the same location, a hole 13 is bored through the center and along the axis of the base element 11 and the hub 4. Said hole has a wider, optionally conical and tapered, upper portion 14 and a narrower lower portion 15 such that a screw (supplied separately), comprising a head portion and a narrower shaft portion, where said head portion is narrower that the diameter of the wider upper portion 14 of the hole, but wider that the diameter of the narrower lower portion 15 of the hole, can be inserted into the hole with the bottom of said head portion seated against the surface formed by the junction of the wider upper portion 14 and the narrower lower portion 15 of the hole 13, or if the upper portion of the hole is conical and tapered, then against its conical, tapered surface. The Countersunk Mount is affixed to the substrate with a separately-supplied screw.

The embodiments depicted in FIGS. 1-10, wherein a conduit holder is attached to the top of the rotatable base, is just one possible use of the Twist-Base Mount. Other embodiments may incorporate different holders, fixtures, hooks, anchors, or cleats in place of the conduit holder.

A Twist-Base Mount can be made by insert-molding a 1.5" steel screw element 12 with a polypropylene 2" diameter base element 11 in an injection-molding machine. Typically, the wall thickness of base element 11 (i.e. the distance between the convex, fixture-supporting topside portion 9 and the concave, substrate-facing, underside portion 3) is uniform. One suitable wall thickness when the base is 2" in diameter and made of polypropylene is 0.093 inches. The base element 11 may be made of any elastic material so long as the wall thickness of the base element is adjusted correlatively to produce a similar modulus of flexibility. In the embodiment shown in FIGS. 1-6, the hub 4 extends from the center of the underside portion 3 of the base 11 in the direction of the substrate along the axis of the screw 12 a distance less than the furthest extent of the nubs on the circumferential edge by 150% of the thread pitch of the screw. This relationship between the lower extent of the base 11 and the lower extent of the hub 4 permits the base to rotate 360 degrees while maintaining contact between the nubs and the substrate, yet avoids excessive deformation of the base by over-penetration of the screw into the substrate.

The invention claimed is:

1. A stable, rotatably-adjustable mount for a fixture comprising:
   a plastically-deformable, dome-shaped base having a convex, fixture-supporting topside portion and a concave, substrate-facing, underside portion opposite the topside portion, having a substrate-engaging portion defined by a circumferential edge;
   a single screw with a non-circular head that resists twisting, said head rigidly embedded in a hub extending perpendicularly away from a center of the underside portion, said screw projecting perpendicularly away from the hub and having a pointed substrate-engaging tip and sharp threads to facilitate: (a) self-boring penetration of the substrate, (b) compression of the circumferential edge of the base against the substrate, and (c) a corresponding elastic deformation of the dome; and
   a fixture attached to the fixture-supporting portion of the base; wherein said circumferential edge has protuberances uniformly spaced apart along the edge to provide additional friction between the edge and the substrate to prevent unintentional rotation of the base, and wherein the hub extends away from the center of the underside portion a distance less than a farthest extend of the protuberances.

2. The device of claim 1, in which the diameter of the base is from 1.5 to 2.5 inches and the length of the screw is from 0.5 to 1.5 inches.

3. A device for securely and rotatably holding a first object on a surface of a second object, comprising:
   a deformable hollow base having dome-shaped a wall, the wall having a lower circumferential edge for engaging a substantially flat surface of the second object; and
   a single screw extending lengthwise from a top of the dome-shaped wall along an axis perpendicular to a plane defined by the lower circumferential edge of the dome-shaped wall, the screw projecting perpendicularly away from a hub extending perpendicularly away from a center of an underside portion of the dome-shaped wall;

a fixture attached to the fixture supporting portion of the base; wherein said circumferential edge has protuberances uniformly spaced apart along the edge to provide additional friction between the edge and the substrate to prevent unintentional rotation of the base, and wherein the hub extends away from the center of the underside portion a distance less than a farthest extend of the protuberances.

4. The device of claim 3, in which the base is comprised of a thermoplastic material.

5. The device of claim 4, in which the screw has a head that is embedded in the thermoplastic material.

6. The device of claim 3, in which a countersunk hole is defined at a top of the dome-shaped wall and the screw includes a shank that extends through the hole and a head seated in a countersink of the hole.

7. The device of claim 3, in which the dome-shaped wall is comprised of a polyolefin.

8. The device of claim 7, in which the polyolefin is polypropylene.

9. The device of claim 3, in which the protuberance are a plurality of nubs defined on the lower circumferential edge of the wall of the dome-shaped wall.

10. The device of claim 3, in which the dome shape is a section of a sphere cut by a plane.

11. The device of claim 3, in which the dome shape is a section of an ellipsoid cut by a plane perpendicular to a major or minor axis of the ellipsoid.

12. The device of claim 3, in which the screw has a thread density of at least 10 threads per inch.

13. The device of claim 12, in which the screw is self-tapping.

14. The device of claim 12, in which the screw is self-drilling.

15. The device of claim 3, in which the screw has a thread density of at least 16 threads per inch.

16. The device of claim 3, in which the screw has a tapered shank.

17. The device of claim 3, in which the ratio of the width of the base to the height of the base is from 4 to 8.

18. The device of claim 3, in which the base includes a hub portion extending from the top of the base toward a plane defined by the lower circumferential edge of the wall of the base, the bottom of the hub having a flat surface that acts as a stop to limit deformation of the wall of the hub.

* * * * *